(12) United States Patent
Takeda et al.

(10) Patent No.: US 11,265,856 B2
(45) Date of Patent: Mar. 1, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/635,301

(22) PCT Filed: Jul. 31, 2017

(86) PCT No.: PCT/JP2017/027772
§ 371 (c)(1),
(2) Date: Jan. 30, 2020

(87) PCT Pub. No.: WO2019/026157
PCT Pub. Date: Feb. 7, 2019

(65) Prior Publication Data
US 2020/0374866 A1    Nov. 26, 2020

(51) Int. Cl.
*H04W 72/04* (2009.01)
*H04W 72/12* (2009.01)
*H04L 5/00* (2006.01)

(52) U.S. Cl.
CPC ........ *H04W 72/0413* (2013.01); *H04L 5/0053* (2013.01); *H04W 72/042* (2013.01); *H04W 72/12* (2013.01)

(58) Field of Classification Search
CPC ............. H04W 72/12; H04W 72/0453; H04W 72/042; H04W 72/0413

USPC ......................................................... 370/329
See application file for complete search history.

(56) References Cited

U.S. PATENT DOCUMENTS

2017/0155488 A1    6/2017   Saxena et al.

FOREIGN PATENT DOCUMENTS

| WO | 2016/025836 A1 | 2/2016 |
| WO | 2016/186554 A1 | 11/2016 |

OTHER PUBLICATIONS

Extended European Search Report issued in counterpart European Patent Application No. 17920399.7, dated Dec. 17, 2020 (11 pages).
LG Electronics; "Discussion on UL control with ultra-reliability"; 3GPP TSG RAN WG1 NR Ad-Hoc#2, R1-1710322; Qingdao, P.R. China; Jun. 27-30, 2017 (3 pages).

(Continued)

*Primary Examiner* — Angel T Brockman
(74) *Attorney, Agent, or Firm* — Osha Bergman Watanabe & Burton LLP

(57) ABSTRACT

A terminal is disclosed including a processor that determines uplink control channel resource indexes based on configuration of an uplink bandwidth part (UL BWP) and determines a resource for an uplink control channel based on an uplink control channel resource index indicated from Physical Uplink Control Channel (PUCCH) resource indicator field in downlink control information out of the uplink control channel resource indexes; and a transmitter that transmits the uplink control channel on the resource for the uplink control channel on an active UL BWP. In other aspects, a radio communication method for a terminal and a base station are also disclosed.

5 Claims, 15 Drawing Sheets

(56) References Cited

OTHER PUBLICATIONS

NTT Docomo, Inc.; "Resource allocation for NR PUCCH"; 3GPP TSG RAN WG1 #88 Meeting, R1-1702813; Athens, Greece; Feb. 13-17, 2017 (2 pages).
International Search Report issued in Application No. PCT/JP2017/027772, dated Oct. 17, 2017 (5 pages).
Written Opinion issued in International Application No. PCT/JP2017/027772, dated Oct. 17, 2017 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #88bis; R1-1706040; "On PUCCH Resource Allocation;" Ericsson; Apr. 3-7, 2017; Spokane, US (4 pages).
3GPP TSG RAN WG1 Meeting #89; R1-1707644; "Consideration on NR-PUCCH resource allocation;" LG Electronics, May 15-19, 2017; Hangzhou, P.R. China (6 pages).
Office Action issued in counterpart Chilean Application No. 202000275 dated Jul. 14, 2021 (27 pages).
ZTE; "NR PUCCH resource allocation"; 3GPP TSG RAN WG1 Meeting #89, R1-1707172; Hangzhou, China, May 15-19, 2017 (9 pages).
Panasonic; "Discussion on resource allocation for uplink control channel"; 3GPP TSG RAN WG1 Meeting #89, R1-1708088; Hangzhou, P.R. China, May 15-19, 2017 (3 pages).
NTT Docomo, Inc.; "Views on UL non-contiguous allocation"; 3GPP TSG-RAN WG4-NR Meeting #2, R4-1706828; Qingdao, China, Jun. 27-29, 2017 (4 pages).
Office Action issued in Japanese Application No. 2019-533761; dated Jun. 8, 2021 (4 pages).
Office Action in counterpart European Patent Application No. 17 920 399.7 dated Sep. 20, 2021 (12 pages).

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specification of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), downlink (DL) and/or uplink (UL) communications are carried out by using 1-ms subframes (also referred to as "transmission time intervals (TTIs)," and the like). A subframe is the unit of time for transmitting 1 channel-encoded data packet, and serves as the unit of processing in, for example, scheduling, link adaptation, retransmission control (HARQ (Hybrid Automatic Repeat reQuest)) and so on.

Also, in existing LTE systems, a user terminal (UE (User Equipment)) transmits uplink control information (UCI) by using an uplink control channel (for example, PUCCH (Physical Uplink Control CHannel)) and/or an uplink data channel (for example, PUSCH (Physical Uplink Shared CHannel)). The format of this uplink control channel is referred to as "PUCCH format," and so on.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), studies are in progress to configure one or more bandwidth parts (BWPs) included in a component carrier (CC) or a system bandwidth in UE. A BWP for use in DL communication may be referred to as a "DL BWP," and a BWP for use in UL communication may be referred to as a "UL BWP."

Thus, it is likely that BWP-based control will be used in NR. Nevertheless, not much research has been done on how UE should select the PUSCH resource to use when UL BWPs are introduced. Unless a proper method for selecting PUCCH resources is introduced, flexible control is not possible, and there may be a decline in communication throughput, spectral efficiency, and so forth.

It is therefore an object of the present invention to provide a user terminal and a radio communication method, whereby, even when BWP-based control is implemented, the decline in communication throughput and the like can be reduced.

Solution to Problem

According to one aspect of the present invention, a user terminal has a transmitting section that transmits uplink control information by using an uplink control channel resource in a certain bandwidth part (BWP), a control section that determines an association between the uplink control channel resource and a certain index based on certain information, and specifies the uplink control channel resource.

Advantageous Effects of Invention

According to one aspect of the present invention, the decline in communication throughput and the like can be reduced even when BWP-based control is implemented.

DESCRIPTION OF EMBODIMENTS

In existing LTE (for example, LTE Rel. 8 to 13), PUCCH resources for transmitting UCI are each associated with a given index (which may be referred to as "m" or the like). Index m is numbered sequentially from the end of a carrier's frequency (where the carrier may be a cell, a component carrier (CC), a system bandwidth and the like). Inter-slot frequency hopping is applied to PUCCH resources.

Figure 1:
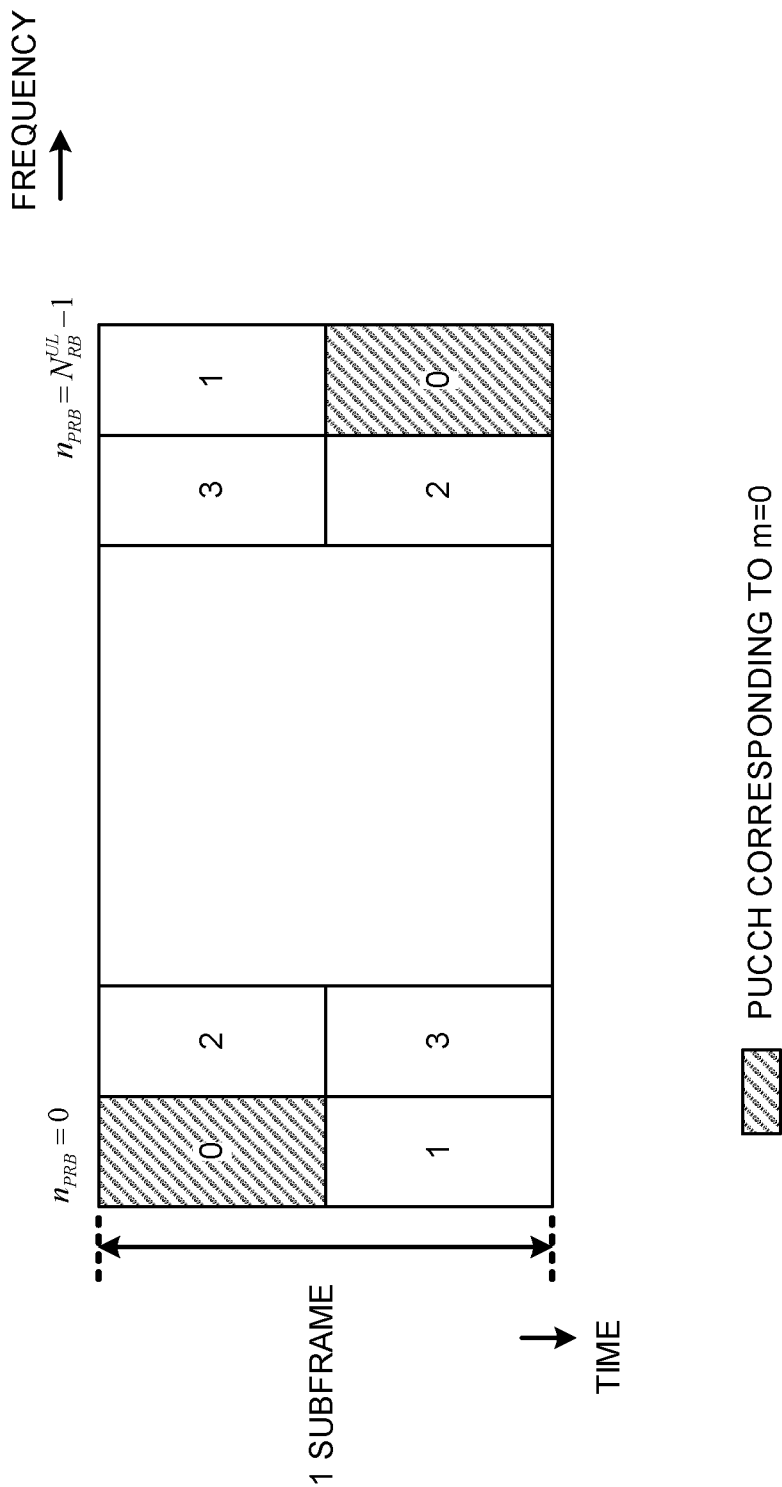
FIG. 1 is a diagram to show examples of associations between PUCCH resources and indices in existing LTE.

FIG. 1 is a diagram to show examples of associations between PUCCH resources and indices in existing LTE. In this example, the uplink transmission bandwidth (system bandwidth) is comprised of $N_{RB}^{UL}$ physical resource blocks (PRBs). For example, the PUCCH resource corresponding to m=0 corresponds to PRB index ($n_{PRB}$)=0 in the first slot, and corresponds to $n_{PRB}$=0 and $N_{RB}^{UL}-1$ in the second slot. Furthermore, different PUCCH resources are allocated to different m's.

Note that, except for some PUCCH formats (for example, PUCCH format 4), one or more PRB resources may be code-division-multiplexed (CDM) in a given PRB.

For example, PUCCH resources for transmitting retransmission control information (also referred to as "HARQ-ACK (Hybrid Automatic Repeat reQuest-ACKnowledgement)," "ACK/NACK (Negative ACK)," "A/N," etc.) in response to DL data (DL data channel (PDSCH (Physical Downlink Shared CHannel))) as feedback may be selected (mapped implicitly) based on the smallest CCE index of the PDCCH that commands the scheduling of the DL data.

Furthermore, to select PUCCH resources for HARQ-ACK feedback, a set of candidate PUCCH resources may be configured by higher layer signaling (for example, RRC signaling), and one of the resources included in the above set of candidates may be designated by a given field (for example, the TPC (Transmit Power Control) field (which may be interpreted as meaning an ARI (ACK/NACK Resource Indicator)), the ARO (ACK/NACK Resource Offset) field, etc.) included in the PDCCH to command PDSCH scheduling.

Envisaging future radio communication systems, studies are underway to allocate ultra-wideband (for example, 200-MHz) CCs to UE. If UE that is configured with ultra-wideband CCs uses the whole system band (for, for example, radio frequency (RF) control (application of ultra-wideband RF filtering), baseband control (ultra-wideband IFFT) and so on that assume receipt in the whole system band) at all times, the UE may consume a large amount of power. Therefore, for NR, how to configure, semi-statically, one or more bandwidth parts (BWPs) in UE, per CC, is under study.

A BWP for use in DL communication may be referred to as a "DL BWP," and a BWP for use in UL communication may be referred to as a "UL BWP." UE may assume that at least 1 DL BWP and 1 UL BWP are active (available), among the BWPs that are configured, at any given time. Furthermore, one or more DL BWPs and/or one or more UL BWPs may have frequency bands that overlap each other.

DL BWPs and UL BWPs may have the same bandwidth as or a narrower bandwidth than the carrier bandwidth (system bandwidth). Furthermore, parameters that every BWP can use might vary depending on UE capabilities, configurations and so on. For example, frequency resources might overlap between a UL BWP for UE 1 and a UL BWP for UE 2, and 1 bandwidth may be larger than the other bandwidth.

BWPs are assumed to be associated with specific numerologies (including subcarrier spacing, cyclic prefix length, and so on). In an active DL BWP, UE receives signals by using numerologies related to this DL BWP, and, in an active UL BWP, the UE transmits signals by using numerologies related to this UL BWP.

BWP configurations may include information related to numerology, locations in frequency (for example, the center frequency, the lower-end frequency, etc.), (for example, the number of "resource blocks" (also referred to as "RBs," "PRBs (Physical RBs)," etc.)), time resources (for example, slot (minislot) indices, cycle, etc.), and so forth.

BWP configurations may be reported by way of, for example, higher layer signaling (for example, RRC (Radio Resource Control) signaling, broadcast information (MIB (Master Information Block), SIBs (System Information Blocks), etc.), MAC (Medium Access Control) signaling, and the like.

At least one of the DL BWPs that are configured (for example, the DL BWP included in the primary CC) may carry a control resource set (CORESET) for a common search space. A CORESET is a set of candidate fields for allocating a downlink control channel (for example, PDCCH (Physical Downlink Control CHannel)), and may be referred to as a "control subband," a "search space set," a "search space resource set," a "control field," a "control subband," an "NR-PDCCH field," and the like.

Furthermore, DL BWPs that are configured may all include, individually, CORESETs for UE-specific search spaces.

UE may receive information about the configurations of CORESETs (which may be referred to as "CORESET configurations") from the gNB. The UE can detect physical layer control signals by monitoring the CORESET configured for the UE itself. CORESET configurations may be reported by using, for example, higher layer signaling (for example, RRC signaling, SIBs, etc.).

The downlink control channel is used to transmit physical layer control signals (for example, downlink control information (DCI)) from a base station (also referred to as, for example, a "BS (Base Station)," a "TRP (Transmission/Reception Point)," an "eNB (eNode B)," a "gNB," and so on) to a user terminal (UE (User Equipment)).

DCI may be scheduling information, including information about at least one of, for example, scheduled data's resources (time and/or frequency resources), transport block (for example, transport block size (TBS)), modulation and/or coding scheme, and delivery acknowledgement information (also referred to as, for example, "retransmission control information," "HARQ-ACK," "ACK/NACK," etc.), and the reference signal for demodulating the data (DMRS).

DCI to schedule receipt of DL data (for example, a downlink shared channel (PDSCH (Physical Downlink Shared CHannel)) and/or measurements of DL reference signals may be referred to as "DL assignment," "DL grant," "DL DCI," and so on. DCI to schedule transmission of UL data (for example, an uplink shared channel (PUSCH (Physical Downlink Shared CHannel)) and/or transmission of UL sounding (measurement) signals may be may be referred to as "UL grant," "UL DCI," and so on.

Thus, it is likely that BWP-based control will be used in NR. Nevertheless, not much research has been done on how UE should select the PUCCH resource to use when UL BWPs are introduced. Unless a proper method for selecting PUCCH resources is introduced, flexible control is not possible, and there may be a decline in communication throughput, spectral efficiency, and so forth.

So, the present inventors have arrived at the present invention in view of the fact that not all UEs communicating in the same cell need to use a common PUCCH resource index association.

Now, embodiments of the present invention will be described below in detail with reference to the accompanying drawings. The radio communication methods according to each embodiment may be applied individually or may be applied in combination.

Note that, in the following embodiments, the prefix "NR-" may be attached to arbitrary signals or channels, which may be construed as meaning that these signals or channels are designed for use in NR.

Note that UCI to carry at least one of an HARQ-ACK, a scheduling request (SR), channel state information (CSI) (for example, periodic CSI (P-CSI), aperiodic CSI (A-CSI), etc.), beam-identifying information, a buffer status report (BSR), a power headroom report (PHR), and other control information may be transmitted by using a PUCCH.

(Radio Communication Method)

First Embodiment

The first embodiment of the present invention relates to a method of assigning numbers to PUCCH resource indices (this method may be referred to as "assignment rule," "PUCCH resource indexing," etc.). Now, to illustrate examples of assignment methods, the method of associating PUCCH resource indices with UL BWP bandwidths (embodiment 1.1), the method of associating PUCCH resource indices with system bandwidths (embodiment 1.2), and the method of selecting PUCCH resource indices independently of UL BWP bandwidths and system bandwidths (embodiment 1.3), will be described below.

Embodiment 1.1

According to embodiment 1.1, PUCCH resource indices are selected based on the configuration of the UL BWP (for example, the bandwidth of the UL BWP). For example, UE may assume that numbers are assigned from the end of the frequency of the UL BWP that is configured (and/or active).

Figure 2:
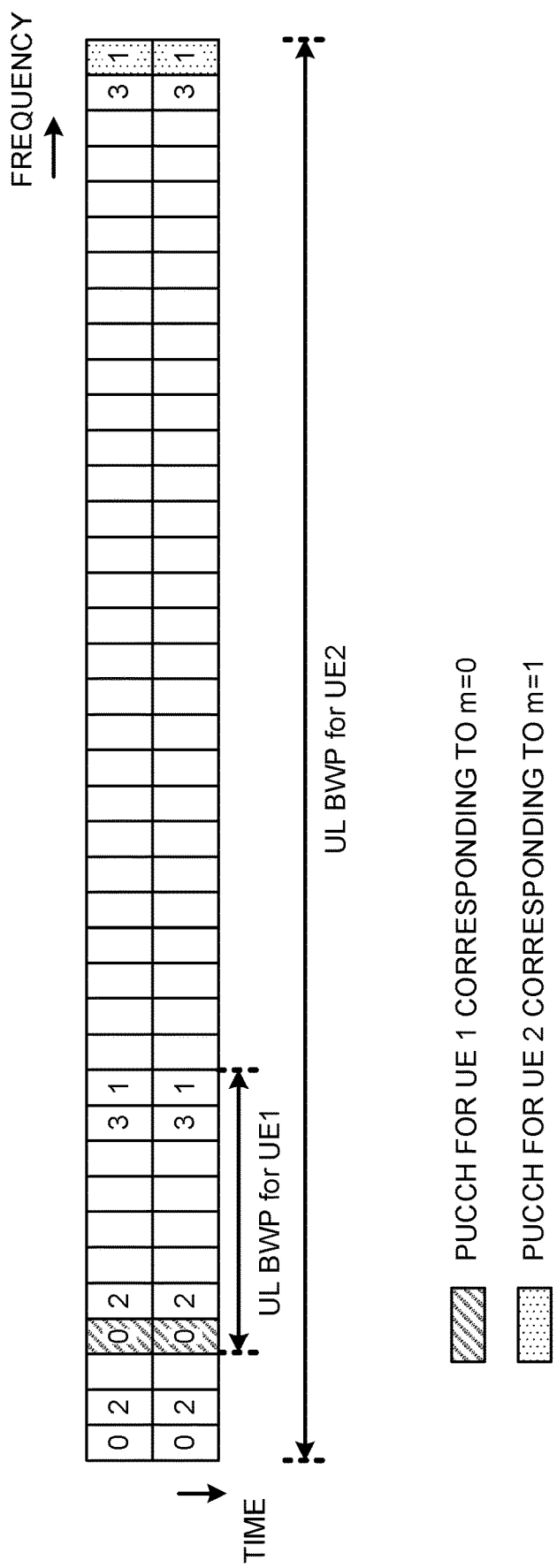
FIG. 2 is a diagram to show examples of associations between PUCCH resources and indices according to embodiment 1.1 of the present invention.

FIG. 2 is a diagram to show examples of associations between PUCCH resources and indices according to embodiment 1.1 of the present invention. Although the following drawings will assume that 1 square represents a resource of 1 PRB and 1 slot, this is by no means limiting. For example, the frequency resource represented by 1 square may be one or more subcarriers, subbands, PRBs, RB groups, and so on. Furthermore, the time resource indicated by 1 square may be one or more symbols, minislots, slots, subframes, etc.

In this example, the UL BWP for UE 1 has a bandwidth of 8 PRBs, and the UL BWP for UE 2 has a bandwidth of 40 PRBs. The PUCCH resource indices for each UE are numbered from the end of each UL BWP's frequency.

FIG. 2 shows that m=0 corresponds to the PRB at the lower end of the BWP and m=1 corresponds to the PRB at the upper end of the BWP, and, following the increase of m, assignments to correspond to PRBs moved towards the center frequency of the BWP are shown, but the order of assigning numbers is not limited to this.

Note that, although FIG. 2 shows PUCCH resources that correspond to m=0 to 3, resources corresponding to the indices of m>4 may also be specified based on the same rule. The same applies to the subsequent drawings.

Referring to FIG. 2, the PUCCH resource for UE 1 corresponding to m=0 and the PUCCH resource for UE 2 corresponding to m=1 are each represented by a hatched square. This example shows a case in which 1 PUCCH resource spans 2 contiguous time units (for example, slots), but 1 PUCCH resource may correspond to 1 time unit, or may correspond to multiple contiguous or non-contiguous time units.

If multiple UL BWPs are configured and these UL BWPs are switched in time and used, UE may select PUCCH resource indices based on the UL BWP that is active.

Figure 3A:
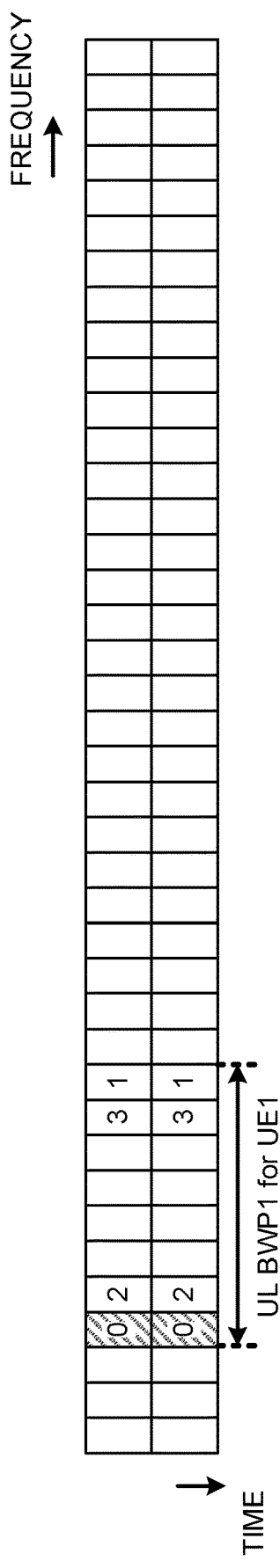
FIGS. 3A and 3B are diagrams to show other examples of associations between PUCCH resources and indices according to embodiment 1.1.
Figure 3B:
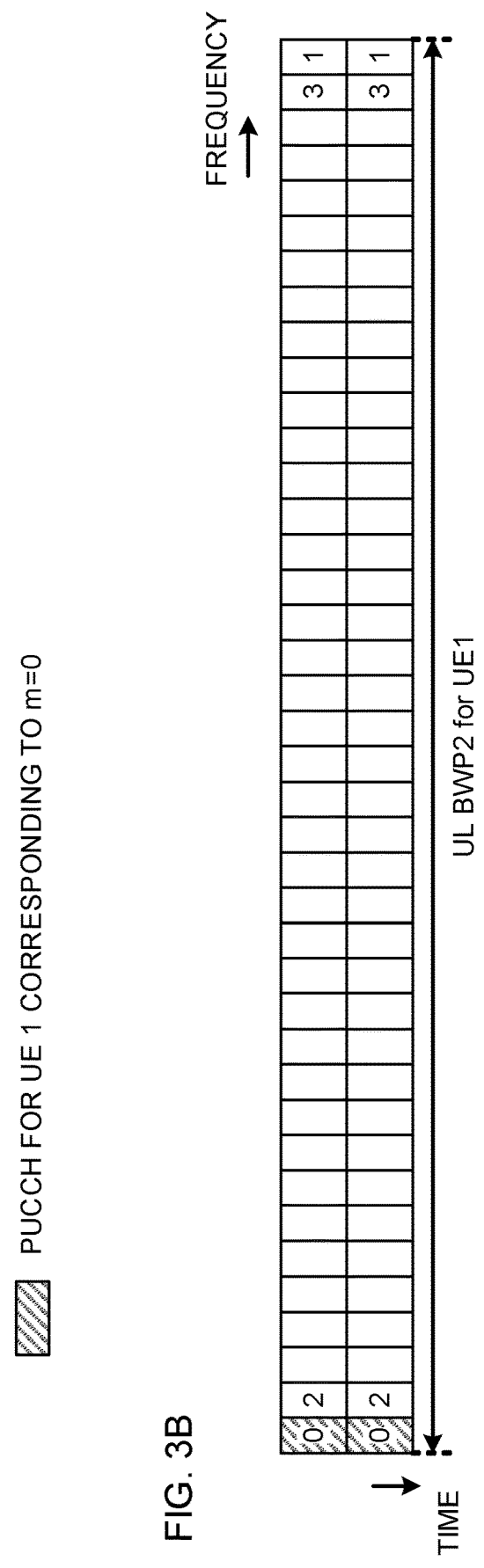

FIGS. 3A and 3B are diagrams to show other examples of associations between PUCCH resources and indices according to embodiment 1.1. In this example, UE 1 is configured with UL BWP 1 having a bandwidth of 8 PRBs and UL BWP 2 having a bandwidth of 40 PRBs. Referring to FIGS. 3A and 3B, the PUCCH resource for UE 1 corresponding to m=0 is represented by a hatched square.

The UE selects the PUCCH resource based on the indexing of FIG. 3A when UL BWP 1 is active, and selects the PUCCH resource based on the indexing of FIG. 3B when UL BWP 2 is active. Thus, even if the same UE uses the same index (for example, m=0), different PUCCH resources may be associated, depending on which UL BWP is active.

When the PUCCH resource is comprised of a plurality of time units, frequency hopping may be applied to each time unit. In this case, the indexing used for the first hop (first time unit) and the indexing used for a second hop (second time unit) may be each selected based on the configuration of the UL BWP (for example, the bandwidth of the UL BWP).

FIGS. 3A and 3B are diagrams to show other examples of associations between PUCCH resources and indices according to embodiment 1.1. This example shows a case similar to that of FIG. 2, but is different in that frequency hopping is applied to PUCCH resources (indexing varies between the first hop and the second hop). Note that, in this example, indices that are symmetrical (reversed in order) in the frequency direction are used in a plurality of time units, but this is by no means limiting.

According to embodiment 1.1 described above, PUCCH resource mapping can be configured in a UE-specific manner and in a UL BWP-specific manner, so that flexible control is possible.

Variation of Embodiment 1.1

1 PUCCH resource may be comprised of 1 frequency unit (for example, PRB), as described above with reference to FIG. 2 and the like, but may be comprised of multiple frequency units. In this case, the multiple frequency units may be contiguous frequency resources, or may be non-contiguous frequency resources.

Figure 5:
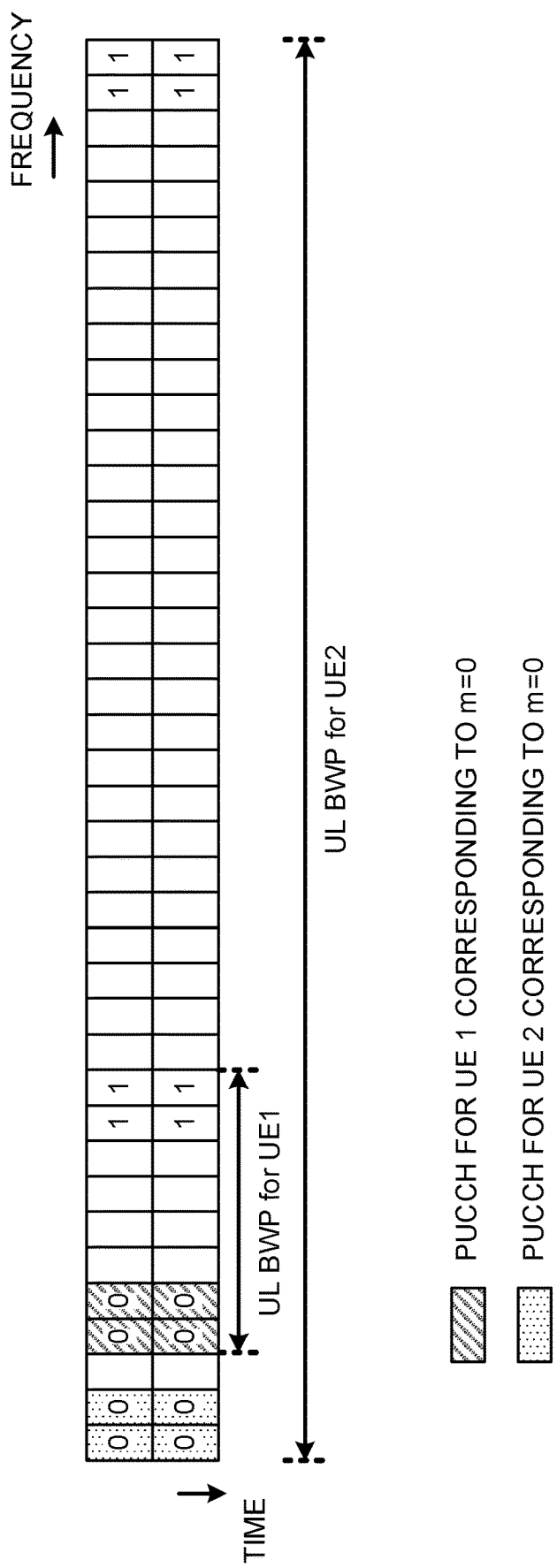
FIG. 5 is a diagram to show examples of associations between PUCCH resources and indices according to embodiment 1.1.

FIG. 5 is a diagram to show examples of associations between PUCCH resources and indices according to a variation of embodiment 1.1. This example shows a case similar to that of FIG. 2, but is different in that a PUCCH resource is comprised of multiple contiguous PRBs.

Figure 6:
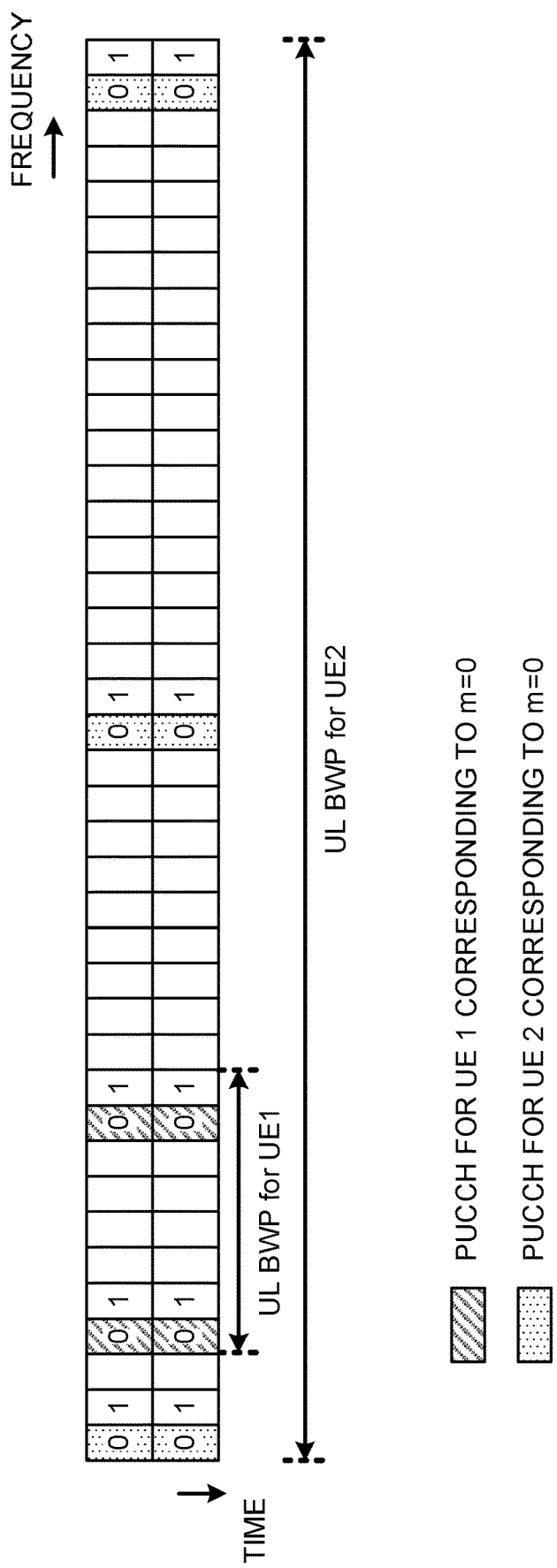
FIG. 6 is a diagram to show other examples of associations between PUCCH resources and indices according to a variation of embodiment 1.1.

FIG. 6 is a diagram to show other examples of associations between PUCCH resources and indices according to a variation of embodiment 1.1. This example shows a case similar to that of FIG. 2, but is different in that a PUCCH resource is comprised of multiple non-contiguous PRBs.

Like the PUCCH resource for UE 2 corresponding to m=0 shown in FIG. 6, with the present invention, resources apart from both ends of the BWP frequency may be included in resources corresponding to the first index (resources of m=0).

Note that the configurations (for example, the number, the size, the frequency locations, etc.) of frequency resources (for example, PRBs) that constitute 1 PUCCH resource may be associated with the configurations of the UL BWP, or may be configured by higher layer signaling (for example, RRC signaling), physical layer signaling (for example, DCI) or a combination of these, independently of the configurations of the UL BWP.

According to the above-described variation of embodiment 1.1, UE can transmit UCI, by properly using PUCCH resources corresponding to multiple frequency units.

Embodiment 1.2

According to embodiment 1.2, PUCCH resource indices are selected based on system bandwidth. For example, UE may assume that numbers are assigned from the end of the frequency of the carrier's system band (system bandwidth) that is configured.

For example, information about the carrier's system bandwidth may be configured in the UE by way of higher layer signaling (for example, RRC signaling), physical layer signaling (for example, DCI) or a combination of these, and the UE may determine the association between PUCCH resources and indices based on this information.

Here, the information about the carrier system bandwidth may include, for example, the system bandwidth, the center frequency, and so on. Here, the information about the carrier system bandwidth may be included in the configuration information of the UL BWP.

Figure 7:
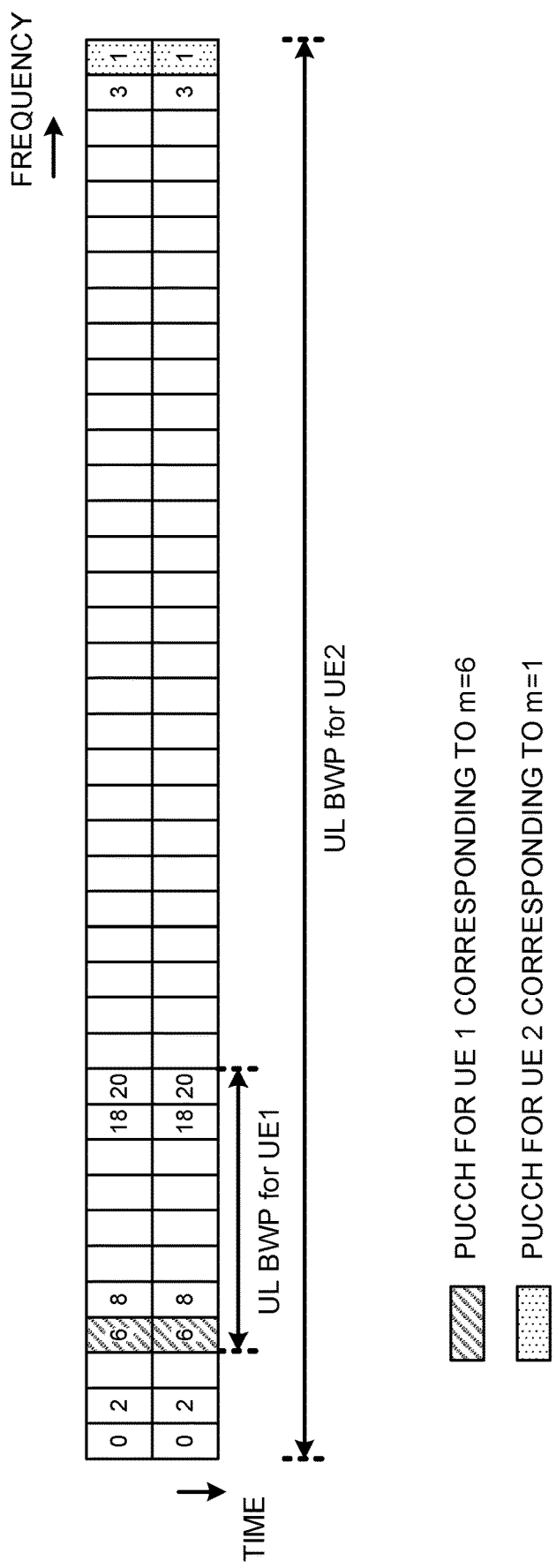
FIG. 7 is a diagram to show examples of associations between PUCCH resources and indices according to embodiment 1.2 of the present invention.

FIG. 7 is a diagram to show examples of associations between PUCCH resources and indices according to embodiment 1.2 of the present invention.

In this example, the UL BWP for UE 1 has a bandwidth of 8 PRBs, and the UL BWP for UE 2 has a bandwidth of 40 PRBs. Furthermore, assume that the system bandwidth configured in these UEs has the same bandwidth as the UL BWP for UE 2. The PUCCH resource indices for each UE are numbered from the end of the frequency of the system bandwidth.

FIG. 7 shows that m=0 corresponds to the PRB at the lower end of the system bandwidth and m=1 corresponds to the PRB at the upper end of the system bandwidth, and, following the increase of m, assignments to correspond to PRBs moved towards the center frequency of the system bandwidth are shown, but the order of assigning numbers is not limited to this.

Referring to FIG. 7, the PUCCH resource for UE 1 corresponding to m=6 and the PUCCH resource for UE 2 corresponding to m=1 are each represented by a hatched square. In this example, the index of the PUCCH resource for UE 1 is an even number between 6 and 20.

This example shows a case in which 1 PUCCH resource spans 2 contiguous time units (for example, slots), but, as has been described earlier with respect to embodiment 1.1, 1 PUCCH resource may correspond to 1 time unit, or may correspond to multiple contiguous or non-contiguous time units.

Furthermore, as described above with the variation of embodiment 1.1, 1 PUCCH resource may correspond to multiple frequency units.

According to embodiment 1.2 described above, it is possible to allow UEs to share a common understanding of PUCCH resource mapping, so that flexible control is possible.

Embodiment 1.3

According to embodiment 1.3 of the present invention, the PUCCH resource index is selected independently of the UL BWP's bandwidth and the system bandwidth. For example, information about PUCCH resource indexing (which may be referred to as "information about the association between PUCCH resources and PUCCH resource indices") may be configured in UE by way of higher layer signaling (for example, RRC signaling), and the UE may determine the association between PUCCH resource and indices based on this information.

Here, the information about PUCCH resource indexing may be, for example, information about frequency resources (the bandwidth, the center frequency, etc.) that are available for use as PUCCH resources (and that are associated with PUCCH resource indices), and may include information apart from BWP configurations, system bandwidth information, and so on. Note that the information about PUCCH resource indexing may be included in the configuration information of the UL BWP.

Figure 8:
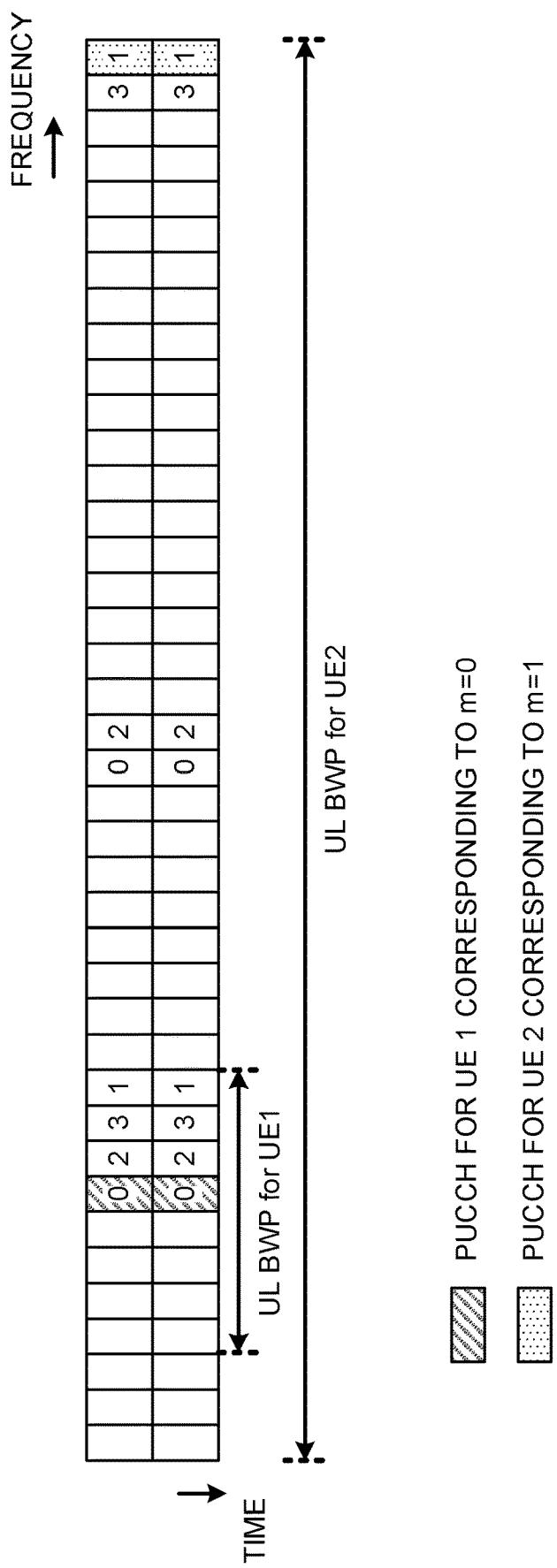
FIG. 8 is a diagram to show examples of associations between PUCCH resources and indices according to embodiment 1.3 of the present invention.

FIG. 8 is a diagram to show examples of associations between PUCCH resources and indices according to embodiment 1.3 of the present invention.

In this example, the UL BWP for UE 1 has a bandwidth of 8 PRBs, and the UL BWP for UE 2 has a bandwidth of 40 PRBs. PUCCH resource indices for UE 1 are configured to correspond to frequency resources equal to or higher than the center frequency in the UL BWP for UE 1. In addition, PUCCH resource indices for UE 2 are configured to correspond to frequency resources equal to or higher than the center frequency minus 1 PRB, in the UL BWPs for UE 2.

Thus, PUCCH resources may be controlled so as to be located in a given frequency range (for example, located at or above/below a given frequency in the UL BWP, at or above/below a given frequency in the system bandwidth, etc.). Note that the configurations of frequency resources for assigning PUCCH resource indices are not limited to these. Furthermore, frequency resources for assigning PUCCH resource indices may be contiguous or non-contiguous in the UL BWP for use for PUCCH transmission by given UE.

Note that UE may assume that the PUCCH resource is an area included in the UL BWP, or assume that the PUCCH resource is allowed to be an area not included in the UL BWP. If the PUCCH resource is not included in the active UL BWP, the UE may assume that it is allowed not to perform the PUCCH transmission.

Although this example shows a case in which 1 PUCCH resource spans 2 contiguous time units (for example, slots), as described earlier with embodiment 1.1, 1 PUCCH resource may correspond to 1 time unit, or correspond to multiple contiguous or non-contiguous time units (may be subject to frequency hopping).

Furthermore, as described above with a variation of embodiment 1.1, 1 PUCCH resource may correspond to multiple frequency units.

According to embodiment 1.3 described above, PUCCH resource mapping can be configured in a UE-specific manner and in a UL BWP-specific manner, so that flexible control is possible.

Second Embodiment

A second embodiment of the present invention relates to a method for specifying PUCCH resources (for example, a method for specifying PUCCH resource indices).

The UE may select a PUCCH resource by using one or a combination of a parameter that is configured by higher layer signaling (for example, RRC signaling), information reported by physical layer signaling (for example, DCI), a given CCE index (for example, the minimum CCE index) pertaining to the PDCCH that commands scheduling of the PDSCH, information about the scheduled PDSCH's frequency resource (for example, a given PRB index (such as the minimum PRB index in the scheduled resource)) and/or others.

Based on a given field included in the PDCCH that commands scheduling of the PDSCH, the UE may select the PUCCH resource (for example, the PUCCH resource for the HARQ-ACK to be transmitted in response to receipt of this PDSCH). This given field may be referred to as a "PUCCH resource indicator field (PUCCH resource indication field)," a "PUCCH resource allocation field," and so on, and may be interpreted as meaning a field for use in existing LTE (for example, TPC), or may be a new field.

The PUCCH resource indication field may be configured by a certain number of bits (for example, 2 bits, 3 bits, etc.). In this case, a set of candidate PUCCH resources is configured by higher layer signaling (for example, RRC signaling), and the PUCCH resource indication field may specify one of the resources included in the above set of candidates. According to this configuration, the number of bits required for the PUCCH resource indication field can be reduced.

Also, the PUCCH resource indication field may carry the same content as the resource allocation (RA (Resource Allocation)) field used in existing DCI. The RA field of DCI corresponds to, for example, type 0, which represents a bitmap for PRBs (or PRB group), type 2, which represents the starting index and length of contiguous PRBs and/or the like, but the PUCCH resource indication field may be assumed to represent at least one such resource allocation method. According to this configuration, PUCCH resources can be controlled dynamically and flexibly. The number of bits in the PUCCH resource indication field and/or the resource indication type may be configured in UE by higher layer signaling.

Note that, if 1 PUCCH resource hops from frequency to frequency in multiple time units, 1 PUCCH resource indication field included in the PDCCH may carry information that shows the combination of frequency resources for multiple hops (for example, the first hop and the second hop), or a plurality of PUCCH resource indication fields included in the PDCCH may each carry information that shows frequency resources for different hops.

Figure 4:
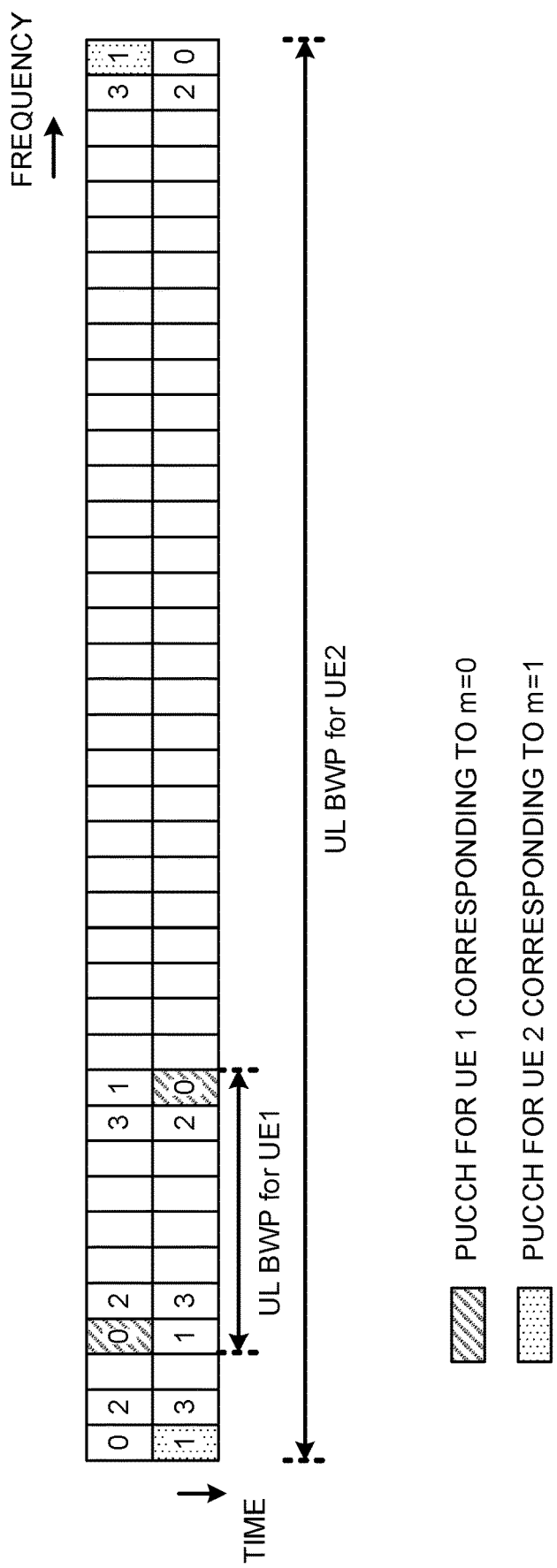
FIG. 4 is a diagram to show yet other examples of associations between PUCCH resources and indices according to embodiment 1.1.
Figure 9:
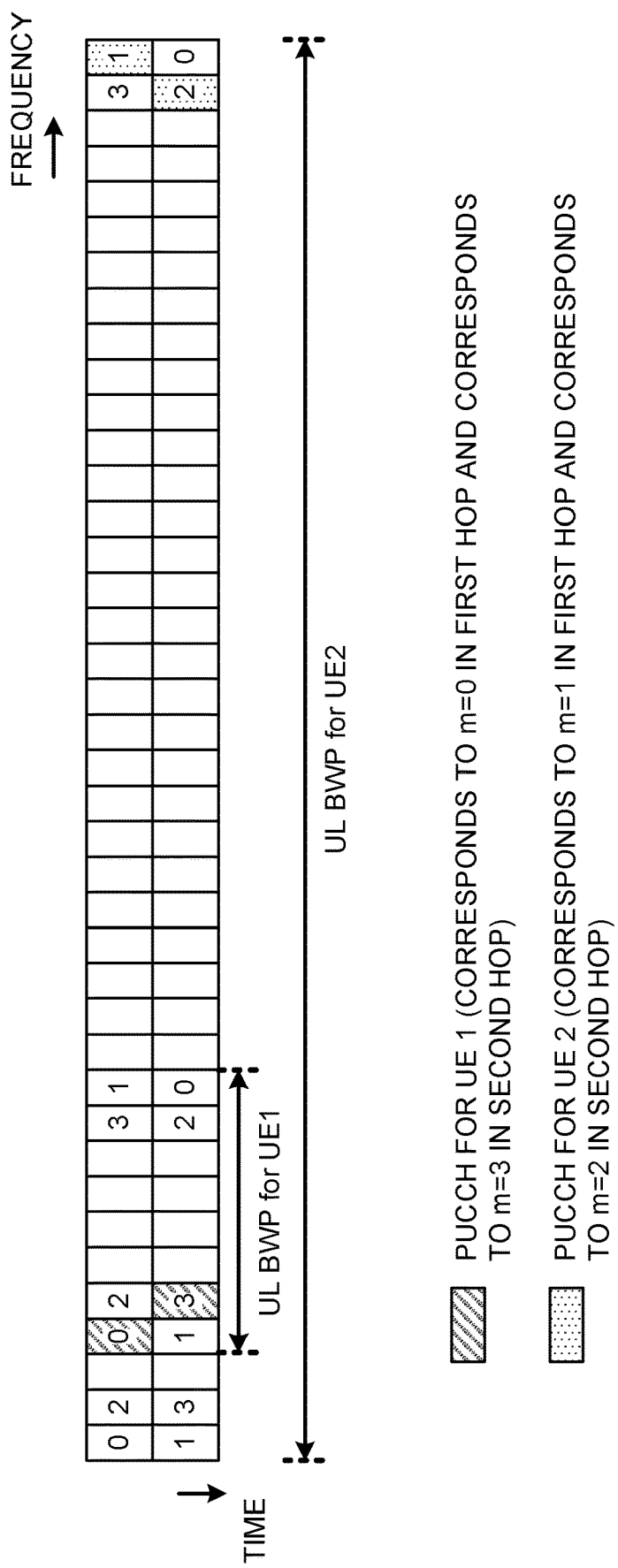
FIG. 9 is a diagram to show an example of specifying a PUCCH resource's multiple hops according to a second embodiment of the present invention.

FIG. 9 is a diagram to show an example of specifying multiple hops of a PUCCH resource according to a second embodiment of the present invention. This example shows a case similar to that of FIG. 4, but is different in that different indices are used in multiple hops. The PUCCH resource for UE 1 corresponds to m=0 in the first hop and corresponds to m=3 in the second hop. The PUCCH resource for UE 1 corresponds to m=1 in the first hop and corresponds to m=2 in the second hop.

Note that, although examples have been described so far in which 1 PUCCH resource is allocated to 1 UE, this is by no means limiting. A plurality of (for example, 2) PUCCH resources may be allocated to 1 UE. In this case, the UE may achieve transmission diversity gain by using multiple PUCCH resources.

In this case, for the UE, multiple PUCCH resources may each be configured (reported) based on the method described above with the second embodiment and/or other methods. For example, the UE may specify multiple PUCCH resources based on a plurality of PUCCH resource indication fields, and use these PUCCH resources.

Furthermore, based on 1 PUCCH resource that is configured (reported), the UE may derive other PUCCH resources to use for transmission diversity.

Transmission diversity to use multiple PUCCH resources may be implemented by using existing diversity techniques (open loop type, closed loop type, etc.), or by using methods to enhance/modify these techniques.

For example, this transmit diversity may be implemented by using a space-frequency block code (SFBC), whereby multiple PUCCH resources are Alamouti-encoded in the frequency domain (these signals are combined and encoded as 1 block), a space-time block code (STBC), whereby multiple PUCCH resources are Alamouti-encoded in the time domain, space orthogonal resource transmission diversity (SORTD (Spatial Orthogonal-Resource Transmit Diversity)), in which multiple PUCCH resources are used for transmission at different antenna ports, and so forth.

According to the second embodiment described above, even if PUCCH indexing that is different from that of conventional LTE is employed, as shown in the first embodiment, UE can still properly identify PUCCH resources.

Variation

Note that information as to which PUCCH resource indexing of embodiments 1.1 to 1.3 is used may be configured (reported) by higher layer signaling (for example, RRC signaling), physical layer signaling or a combination of these. This information may be included in the configuration information of the UL BWP, and may be configured in a UL BWP-specific manner.

Furthermore, although embodiment 1.1 has shown an example in which PUCCH resource indexing is determined based on the configuration (for example, the bandwidth) of the UL BWP, PUCCH resource indexing may be selected based on the configuration of the DL BWP, in addition to or instead of the configuration of the UL BWP. For example, UE may select the resource for an HARQ-ACK, which is transmitted in response to receipt of PDSCH, based on the configuration of the DL BWP, in which at least one of the PDCCH to command scheduling of the PDSCH and the PDSCH is received.

Furthermore, each embodiment may be designed differently for each UCI type (HARQ-ACK, CSI, SR, etc.).

(Radio Communication System)

Now, the structure of a radio communication system according to one embodiment of the present invention will be described below. In this radio communication system, communication is performed using 1 of the radio communication methods according to the herein-contained embodiments of the present invention, or a combination of these.

Figure 10:
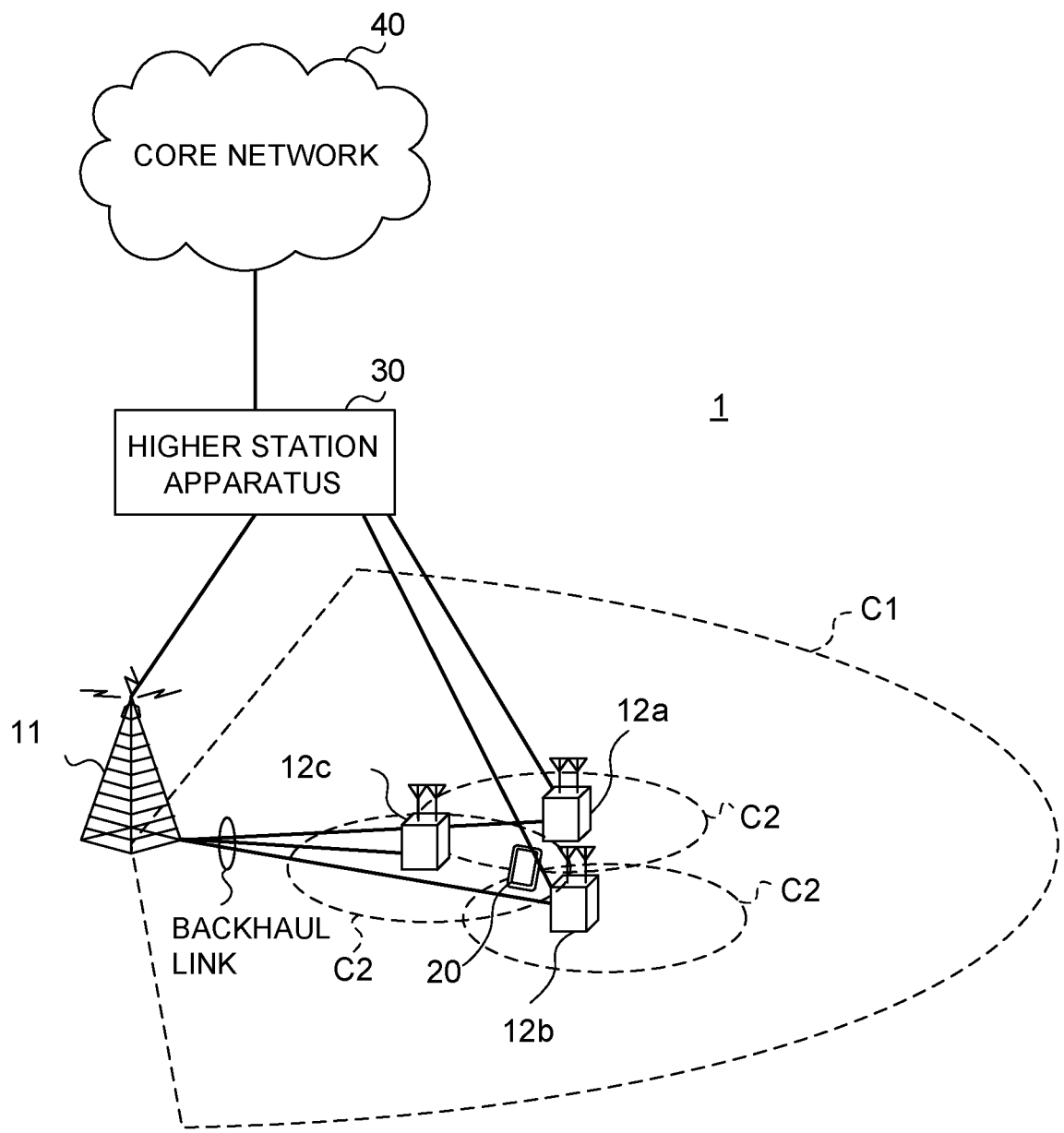
FIG. 10 is a diagram to show an exemplary schematic structure of a radio communication system according to one embodiment of the present invention.

FIG. 10 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

A numerology may refer to communication parameters that are applied to transmission and/or receipt of a given signal and/or channel, and represent at least one of the subcarrier spacing, the bandwidth, the duration of symbols, the duration of cyclic prefixes, the duration of subframes, the duration of TTIs, the number of symbols per TTI, the radio frame configuration, the filtering process, the windowing process and so on.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or contiguous resource blocks per terminal, and allowing a number of terminals to use mutually different bands. Note that the uplink and downlink radio access schemes are not limited to these combinations, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 11:
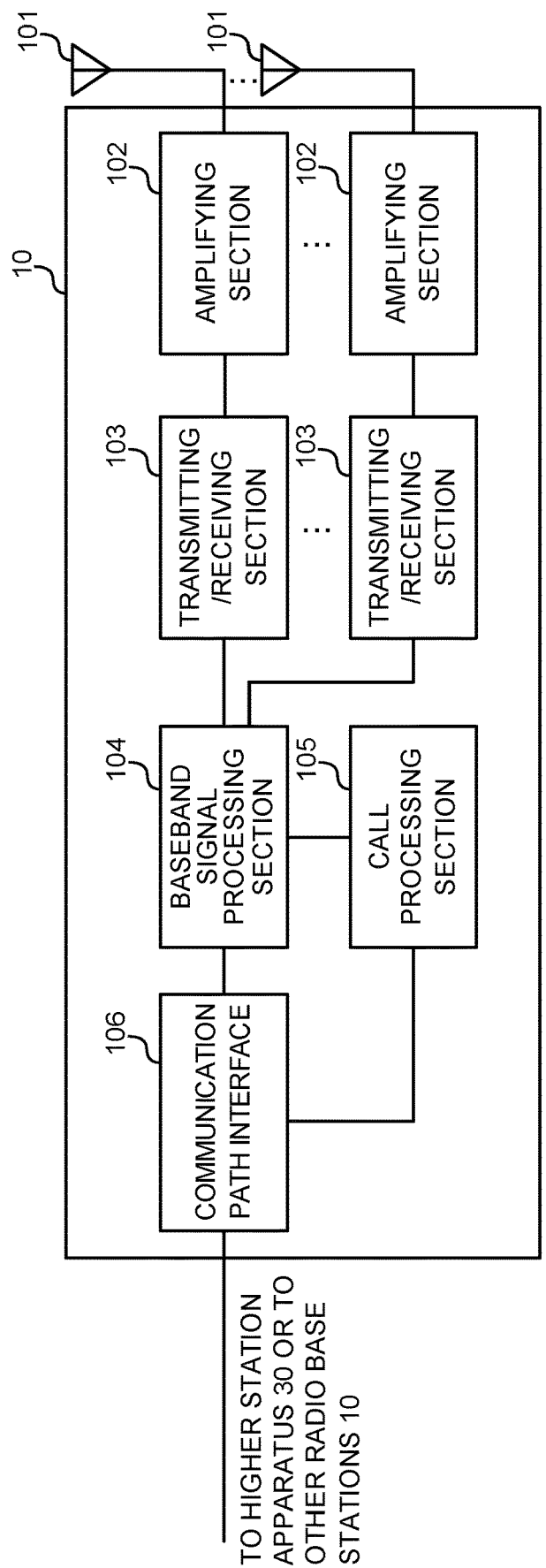
FIG. 11 is a diagram to show an exemplary overall structure of a radio base station according to one embodiment of the present invention.

FIG. 11 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit a signal/channel to a user terminal 20 by using a given BWP (DL BWP). The transmitting/receiving sections 103 may also receive a signal/channel transmitted from the user terminal 20 by using a given BWP (UL BWP). For example, the transmitting/receiving sections 103 may receive UCI transmitted using a PUCCH resource in the UL BWP.

Also, the transmitting/receiving sections 103 may transmit BWP configuration information, information about PUCCH resource indexing, information about the system bandwidth of a given carrier (CC) and so on, to the user terminal 20.

Figure 12:
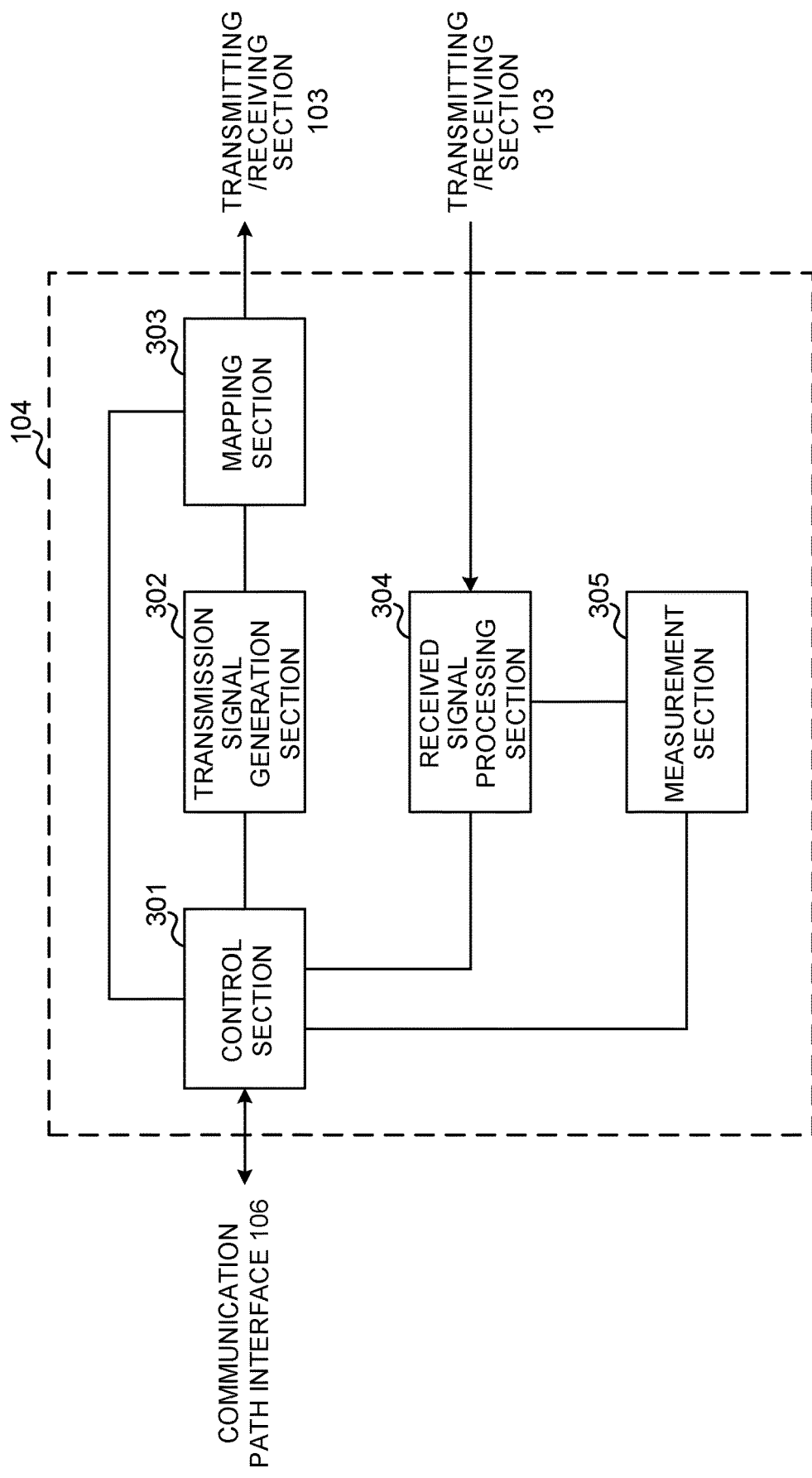
FIG. 12 is a diagram to show an exemplary functional structure of radio base station according to one embodiment of the present invention.

FIG. 12 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that information for judging the association between uplink control channel resources (for example, PUCCH resources) and given indices (for example, PUCCH resource indices) is transmitted to the user terminal 20.

This information may be configuration information of a given BWP (for example, UL BWP), may be information about the system bandwidth (configurations of the system bandwidth, etc.) in which the given BWP is included, or may be information that is different from the above configuration information of the given BWP and the above information of the system bandwidth.

The control section 301 may exert control so that the uplink control channel resource indication field for determining the location of the PUCCH resource is transmitted to the user terminal 20.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

(User Terminal)

Figure 13:
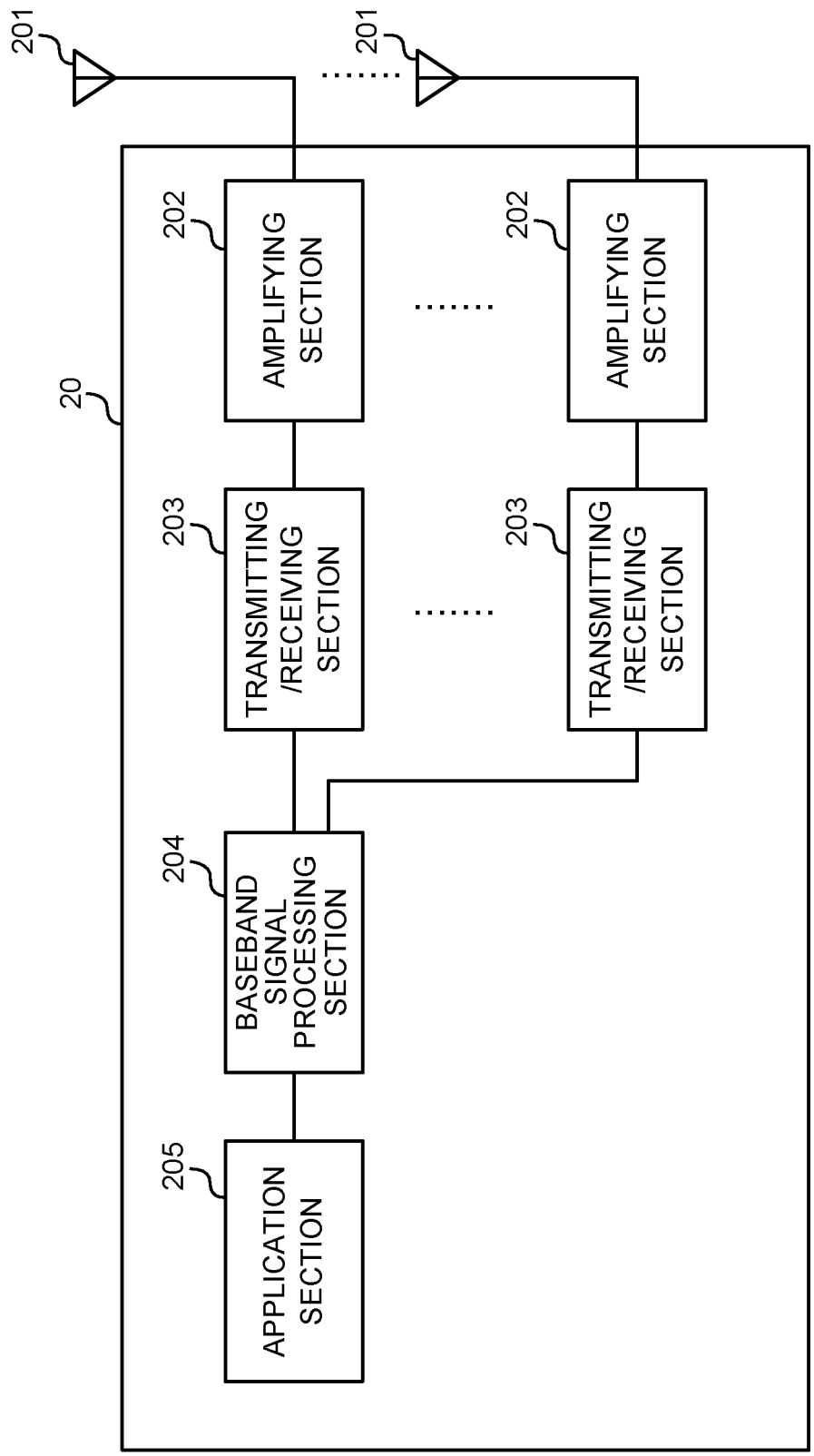
FIG. 13 is a diagram to show an exemplary overall structure of a user terminal according to one embodiment of the present invention.

FIG. 13 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit a signal/channel to a user terminal 20 by using a given BWP (UL BWP). For example, the transmitting/receiving sections 203 may transmit UCI, by using a PUCCH resource, in the UL BWP. The transmitting/receiving sections 203 may also receive a signal/channel transmitted from the radio base station 10 by using a given BWP (DL BWP).

Also, the transmitting/receiving sections 203 may transmit BWP configuration information, information about PUCCH resource indexing, information about the system bandwidth of a given carrier (CC) and so on, from the radio base station 10.

Figure 14:
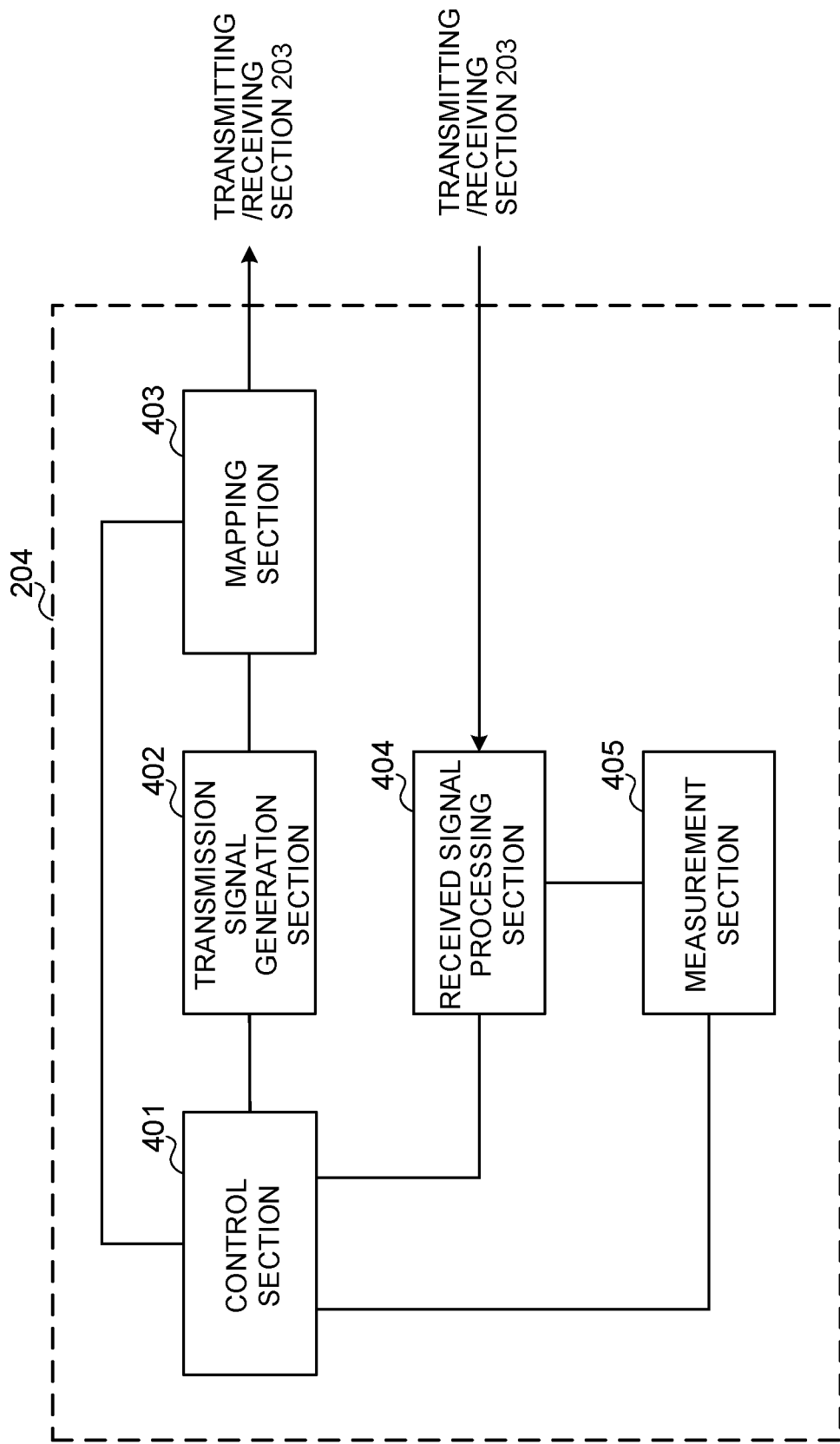
FIG. 14 is a diagram to show an exemplary functional structure of a user terminal according to one embodiment of the present invention.

FIG. 14 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may determine the association between uplink control channel resources (for example, PUCCH resources) and given indices (for example, the indices of PUCCH resources) based on given information, and specify the PUCCH resource for transmitting UCI.

The control section 401 may determine the above association based on the configuration of a given BWP (for example, UL BWP).

The control section 401 may determine the above association based on the system bandwidth (system bandwidth setting, etc.), in which the given BWP is included, regardless of the above given BWP's configuration.

The control section 401 may determine the above association based on information (for example, information about PUCCH resource indexing) that relates to the frequency resources with which the above given indices are associated, and that is different from the above given BWP's configuration and information about the system bandwidth (the system band, the component carrier, etc.) in which the given BWP is included.

The control section 401 may determine the location of the PUCCH resource based on an uplink control channel resource indication field, which is included in downlink control information (for example, DL assignment) that commands the scheduling of a given downlink shared channel (for example, PDSCH).

Also, when various pieces of information reported from the radio base station 10 are acquired from the received signal processing section 404, the control section 401 may update the parameters used in the control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by 1 piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
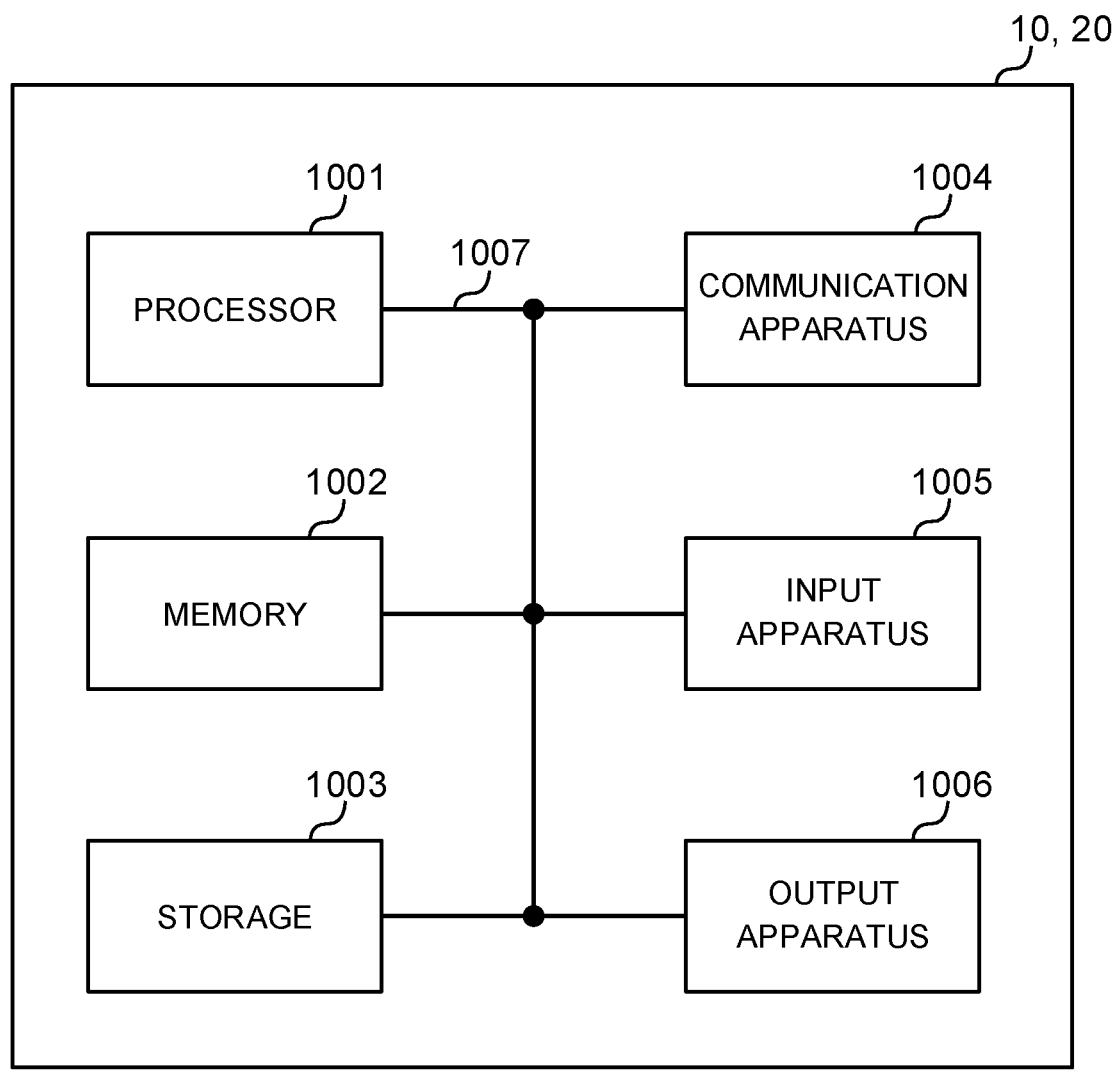
FIG. 15 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 15 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read certain software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on).

Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may be comprised of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or multiple slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or more contiguous subcarriers in the frequency domain. Also, an RB may include one or more symbols in the time domain, and may be 1 slot, 1 mini-slot, 1 subframe or 1 TTI long. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are simply examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a processor that:
      determines uplink control channel resource indexes based on configuration of an uplink bandwidth part (UL BWP) and
      determines a resource for an uplink control channel based on an uplink control channel resource index indicated from Physical Uplink Control Channel (PUCCH) resource indicator field in downlink control information out of the uplink control channel resource indexes; and
   a transmitter that transmits the uplink control channel on the resource for the uplink control channel on an active UL BWP, wherein the transmitter is configured not to transmit the uplink control channel, when the resource is not included in the active UL BWP.

2. The terminal according to claim 1, wherein the processor determines, based on the uplink control channel resource index, that the resource is multiple non-contiguous physical resource blocks.

3. A radio communication method for a terminal, comprising:
   determining uplink control channel resource indexes based on configuration of an uplink bandwidth part (UL BWP);
   determining a resource for an uplink control channel based on an uplink control channel resource index indicated from Physical Uplink Control Channel (PUCCH) resource indicator field in downlink control information out of the uplink control channel resource indexes; and
   transmitting the uplink control channel on the resource for the uplink control channel on an active UL BWP, and not transmitting the uplink control channel, when the resource is not included in the active UL BWP.

4. A base station comprising:
   a transmitter that transmits, to a terminal, configuration of an uplink bandwidth part (UL BWP) used for determining uplink control channel resource indexes and downlink control information including Physical Uplink Control Channel (PUCCH) resource indicator field used for indicating an uplink control channel resource index out of the uplink control channel resource indexes; and
   a receiver that receives an uplink control channel on a resource, which is determined based on the uplink control channel resource index by the terminal, for the uplink control channel on an active UL BWP, wherein the receiver is configured not to receive the uplink control channel, when the resource is not included in the active UL BWP.

5. A system comprising:
a terminal that comprises:
  a processor that:
    determines uplink control channel resource indexes based on configuration of an uplink bandwidth part (UL BWP) and
    determines a resource for an uplink control channel based on an uplink control channel resource index indicated from Physical Uplink Control Channel (PUCCH) resource indicator field in downlink control information out of the uplink control channel resource indexes; and
  a transmitter of the terminal that transmits the uplink control channel on the resource for the uplink control channel on an active UL BWP, wherein the transmitter of the terminal is configured not to transmit the uplink control channel, when the resource is not included in the active UL BWP; and
a base station that comprises:
  a transmitter of the base station that transmits, to the terminal, the configuration of the UL BWP and the downlink control information; and
  a receiver that receives the uplink control channel on the resource on the active UL BWP, wherein the receiver is configured not to receive the uplink control channel, when the resource is not included in the active UL BWP.

\* \* \* \* \*